United States Patent
Fongalland et al.

(10) Patent No.: US 12,249,744 B2
(45) Date of Patent: *Mar. 11, 2025

(54) CATALYSED, ION-CONDUCTING MEMBRANE

(71) Applicant: JOHNSON MATTHEY HYDROGEN TECHNOLOGIES LIMITED, London (GB)

(72) Inventors: Dash Fongalland, Reading (GB); Jonathan Sharman, Reading (GB)

(73) Assignee: Johnson Matthey Hydrogen Technologies Limted, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/320,370

(22) Filed: May 19, 2023

(65) Prior Publication Data

US 2023/0369624 A1 Nov. 16, 2023

Related U.S. Application Data

(63) Continuation of application No. 17/596,614, filed as application No. PCT/GB2020/052011 on Aug. 21, 2020, now Pat. No. 11,705,568.

(30) Foreign Application Priority Data

Aug. 22, 2019 (GB) ...................... 1912062

(51) Int. Cl.
 *H01M 8/10* (2016.01)
 *H01M 4/88* (2006.01)
 *H01M 4/90* (2006.01)
 *H01M 8/1004* (2016.01)

(52) U.S. Cl.
 CPC ......... *H01M 8/1004* (2013.01); *H01M 4/881* (2013.01); *H01M 4/8828* (2013.01); *H01M 4/9083* (2013.01)

(58) Field of Classification Search
 CPC ............. H01M 8/1004; H01M 8/1041; H01M 8/1069; H01M 8/0202; H01M 8/0297; H01M 4/8803; H01M 4/8807; H01M 4/881; H01M 4/8828; H01M 4/8842; H01M 4/9083; H01M 4/9075

See application file for complete search history.

(56) References Cited

U.S. PATENT DOCUMENTS

| | | | |
|---|---|---|---|
| RE37,307 E | 8/2001 | Bahar et al. | |
| 7,807,063 B2 | 10/2010 | Liu et al. | |
| 7,867,669 B2 | 1/2011 | Liu et al. | |
| 11,705,568 B2 * | 7/2023 | Fongalland | H01M 4/8605 429/482 |
| 2002/0090543 A1 | 7/2002 | Okamoto | |
| 2005/0214610 A1 | 9/2005 | Yoshimura et al. | |
| 2007/0231671 A1 | 10/2007 | Inasaki et al. | |
| 2009/0075155 A1 | 3/2009 | Reshetenko et al. | |
| 2010/0330452 A1 | 12/2010 | Paik et al. | |
| 2011/0091790 A1 | 4/2011 | Barnwell et al. | |
| 2011/0143254 A1 | 6/2011 | Kongkanand et al. | |
| 2011/0244358 A1 | 10/2011 | Yamauchi et al. | |
| 2012/0258037 A1 | 10/2012 | Pham et al. | |
| 2012/0321989 A1 | 12/2012 | Tanuma | |
| 2014/0342262 A1 | 11/2014 | Brett et al. | |
| 2015/0044593 A1 * | 2/2015 | Tanuma | H01M 8/1004 429/481 |
| 2019/0379064 A1 | 12/2019 | Kawashima et al. | |

FOREIGN PATENT DOCUMENTS

| | | |
|---|---|---|
| JP | 2006294594 A | 10/2006 |
| KR | 1020070020702 A | 2/2007 |
| KR | 20140103178 A | 8/2014 |
| WO | 2011/021034 A1 | 2/2011 |
| WO | 2012/080726 A1 | 6/2012 |
| WO | 2013/045894 A1 | 4/2013 |
| WO | 2017/129982 A1 | 8/2017 |

OTHER PUBLICATIONS

U.S. Appl. No. 17/596,614, filed Dec. 14, 2021.

* cited by examiner

*Primary Examiner* — Raymond Alejandro
(74) *Attorney, Agent, or Firm* — BakerHostetler

(57) ABSTRACT

A catalysed ion-conducting membrane comprising an ion-conducting membrane, an electrocatalyst layer having two opposing faces, and a layer A comprising an ion-conducting material and a carbon containing material, and methods for preparing the catalysed ion-conducting membrane are provided.

18 Claims, 7 Drawing Sheets

CATALYSED, ION-CONDUCTING MEMBRANE

CROSS-REFERENCE TO RELATED APPLICATIONS

This application is a continuation of U.S. Ser. No. 17/596,614, filed Dec. 14, 2021 (now U.S. Pat. No. 11,705,568, issued Jul. 18, 2023) as the national stage entry of PCT/GB2020/052011, filed Aug. 21, 2020, which claims priority to GB 1912062.5, filed Aug. 22, 2019, the entire contents of each of which are incorporated herein by reference.

FIELD OF THE INVENTION

The present invention relates to a catalysed ion-conducting membrane. More specifically, the present invention relates to a catalysed ion-conducting membrane comprising an additional layer on a face of an electrocatalyst layer.

BACKGROUND OF THE INVENTION

A fuel cell is an electrochemical cell comprising two electrodes separated by an electrolyte. A fuel, e.g. hydrogen, an alcohol such as methanol or ethanol, or formic acid, is supplied to the anode and an oxidant, e.g. oxygen or air, is supplied to the cathode. Electrochemical reactions occur at the electrodes, and the chemical energy of the fuel and the oxidant is converted into electrical energy and heat. Electrocatalysts are used to promote the electrochemical oxidation of the fuel at the anode and the electrochemical reduction of oxygen at the cathode.

Fuel cells are usually classified according to the nature of the electrolyte employed. Often the electrolyte is a solid polymeric ion-conducting membrane, in which the ion-conducting membrane is electronically insulating but ionically conducting. In the proton exchange membrane fuel cell (PEMFC) the ion-conducting membrane is proton conducting, and protons, produced at the anode, are transported across the ion-conducting membrane to the cathode, where they combine with oxygen to form water.

A principal component of the PEMFC is the membrane electrode assembly, which is essentially composed of five layers. The central layer is the polymer ion-conducting membrane. On either side of the ion-conducting membrane there is an electrocatalyst layer, containing an electrocatalyst designed for the specific electrolytic reaction. Finally, adjacent to each electrocatalyst layer there is a gas diffusion layer. The gas diffusion layer must allow the reactants to reach the electrocatalyst layer and must conduct the electric current that is generated by the electrochemical reactions. Therefore, the gas diffusion layer must be porous and electrically conducting.

Examples of ways in which membrane electrode assemblies can be constructed are as follows:
(i) The electrocatalyst layer may be applied to the gas diffusion layer to form a gas diffusion electrode. A gas diffusion electrode is placed on each side of an ion-conducting membrane and laminated together to form the five-layer membrane electrode assembly;
(ii) The electrocatalyst layer may be applied to both faces of the ion-conducting membrane. Subsequently, a gas diffusion layer is applied to each face of the catalyst coated ion-conducting membrane.
(iii) A membrane electrode assembly can be formed from an ion-conducting membrane coated on one side with an electrocatalyst layer, a gas diffusion layer adjacent to that electrocatalyst layer, and a gas diffusion electrode on the other side of the ion-conducting membrane.

Typically, tens or hundreds of membrane electrode assemblies are required to provide enough power for most applications, so multiple membrane electrode assemblies are assembled to make up a fuel cell stack. Flow field plates are used to separate the membrane electrode assemblies. The plates perform several functions: supplying the reactants to the membrane electrode assemblies; removing products; providing electrical connections; and providing physical support.

When preparing an electrocatalyst layer, there are certain desirable features for high performance. In particular, it is desirable to use electrocatalysts which have high activity for the particular electrochemical reaction being catalysed. For example, in the case of PEMFC cathodes, it is desirable to use an electrocatalyst with high activity for the oxygen reduction reaction. Electrocatalyst layers containing such high activity electrocatalysts will demonstrate high performance when pure oxygen is supplied as the oxidant and electrochemical performance is under kinetic control. However, such electrocatalyst layers may not demonstrate high performance when air is supplied as the oxidant, i.e. under real-world conditions, due to, for example, high density and low permeability of the electrocatalyst layer.

It is important for membrane electrode assemblies to have good performance at high current densities and there is a continued need for membrane electrode assemblies with improved performance. In particular, there is a need for membrane electrode assemblies containing electrocatalyst layers with high kinetic activity which also perform well in real-world conditions. i.e. on air operation.

SUMMARY OF THE INVENTION

It is an object of the present invention to provide catalysed ion-conducting membranes which demonstrate good performance at high current densities under real-world condition operation of membrane electrode assemblies. Accordingly, the present invention provides a catalysed ion-conducting membrane comprising an ion-conducting membrane, an electrocatalyst layer having two opposing faces, and a layer A, wherein:
the layer A and the ion-conducting membrane are adjacent to opposite faces of the electrocatalyst layer;
the layer A comprises an ion-conducting material $I_A$ and a carbon containing material $C_A$;
the electrocatalyst layer comprises an ion-conducting material $I_B$ and an electrocatalyst.

The term "catalysed membrane" used herein refers to an arrangement, as defined in the invention, which comprises an ion-conducting membrane, a layer A and an electrocatalyst layer as defined in the invention, regardless of how the arrangement is prepared.

The inventors have surprisingly found that layer A can compensate for the low permeability associated with electrocatalyst layers which have inherently high kinetic activity for the desired electrochemical reaction. The combination of high permeability and kinetic activity results in high levels of electrochemical performance under real-world conditions.

The present invention also provides a membrane electrode assembly comprising the catalysed ion-conducting membrane of the invention, and a fuel cell comprising the catalysed ion-conducting membrane, or the membrane electrode assembly, of the invention. The fuel cell is preferably a proton exchange membrane fuel cell.

The present invention also provides a method of preparing the catalysed ion-conducting membrane of the invention, the method comprising:
  i) applying an electrocatalyst layer ink onto a layer A, or onto a layer of a layer A ink; or
  ii) applying a layer A ink onto an electrocatalyst layer, or onto a layer of an electrocatalyst layer ink;
  wherein the electrocatalyst layer ink comprises an ion-conducting material $I_B$ and an electrocatalyst; and
  the layer A ink comprises an ion-conducting material $I_A$ and a carbon containing material $C_A$.

The ion-conducting material $I_B$, electrocatalyst, carbon containing material $C_A$ and ion-conducting material $I_A$ referred to in this method aspect of the invention are the same as those referred to in the catalysed ion-conducing membrane aspect of the invention.

DETAILED DESCRIPTION OF THE INVENTION

Figure 1:
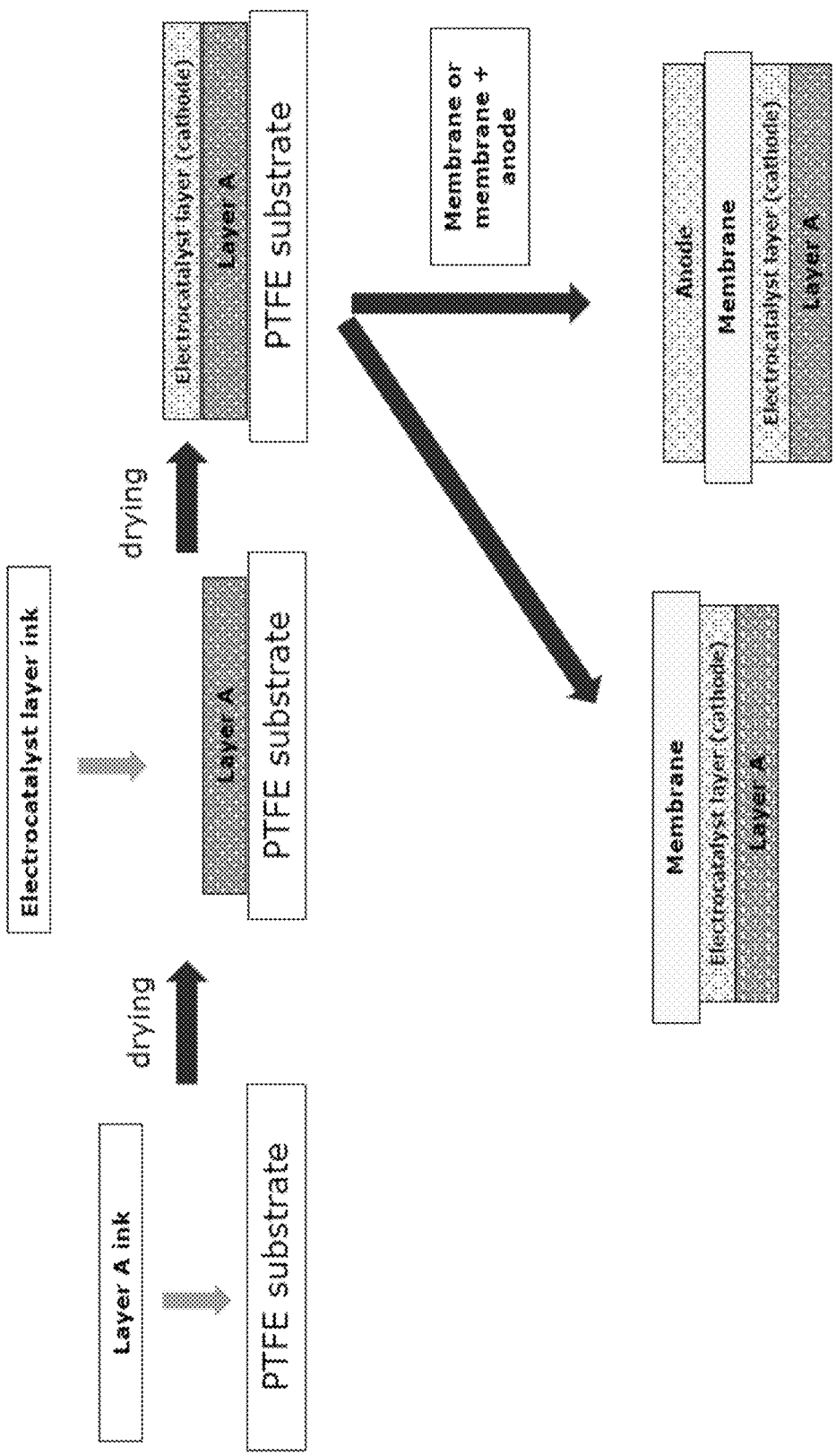
FIG. 1 is a flow diagram representing methods of preparing the catalysed ion-conducting membrane of the invention.

Preferred and/or optional features of the invention will now be set out. Any aspect of the invention may be combined with any other aspect of the invention, unless the context demands otherwise. Any of the preferred or optional features of any aspect may be combined, singly or in combination, with any aspect of the invention, unless the context demands otherwise.

The layer A comprises an ion-conducting material $I_A$ which, suitably, is a proton conducting ionomer. A skilled person understands that an ionomer is a polymer composed of both electrically neutral repeating units and ionizable repeating units covalently bonded to the polymer backbone via side-chains. The ion-conducting material $I_A$ may include ionomers such as perfluorosulphonic acid materials (e.g. Nafion® (Chemours Company), Aciplex® (Asahi Kasei), Aquivion® (Solvay Specialty Polymer), Flemion® (Asahi Glass Co.)), or ionomers based on partially fluorinated or non-fluorinated hydrocarbons that are sulphonated or phosphonated polymers, such as those available from FuMA-Tech GmbH as the Fumapem® P, E or K series of products, JSR Corporation, Toyobo Corporation, and others. Suitably, the ionomer is a perfluorosulphonic acid, in particular the Nafion® range available from Chemours company, especially Nafion® 1100EW, and the Aquivion® range available from Solvay, especially Solvay® 830EW.

The layer A also comprises a carbon material $C_A$, which is preferably in powder form. The carbon material $C_A$ typically has a surface area of no more than 1300 m²/g, preferably no more than 500 m²/g as measure by the Brunauer-Emmett-Teller (BET) nitrogen sorption method. The carbon material typically has a surface area of at least 60 m²/g, preferably at least 200 m²/g.

The carbon material $C_A$ may have a modal pore diameter, as determined by mercury intrusion porosimetry, of no more than 100 nm, preferably no more than 75 nm, more preferably no more than 60 nm. The carbon material may have a modal pore diameter, as determined by mercury intrusion porosimetry, of at least 5 nm, preferably at least 10 nm, more preferably at least 20 nm. The procedure used for mercury intrusion porosimetry is set out in the examples section. In particular, mercury pressure is increased from ~3.0 to 60,000 psia during a measurement, and the porosity at <1 micron and >3 nm pore diameter is used for calculating porosity characteristics.

The carbon material $C_A$ may have a total pore area, as determined by mercury intrusion porosimetry, of no more than 500 m²/g. The carbon material may have a total pore area, as determined by mercury intrusion porosimetry, of at least 30 m²/g, preferably at least 100 m²/g, more preferably at least 150 m²/g. The procedure used for mercury intrusion porosimetry is set out in the examples section. In particular, mercury pressure is increased from ~3.0 to 60,000 psia during a measurement, and the porosity at <1 micron and >3 nm pore diameter is used for calculating porosity characteristics.

The carbon material $C_A$ may be a carbon black or a graphitised carbon black. Accordingly, the carbon material $C_A$ may be, for example, a commercially available carbon black (such as from Cabot Corp. (Vulcan® XC72R) or Akzo Nobel (the Ketjen® black series)) or a graphitised version of these carbon blacks or other commercially available carbon blacks such as acetylene blacks (e.g. those available from Chevron Phillips (Shawinigan Black®) or Denka). The carbon material $C_A$ may also be one specifically designed for use in a fuel cell, such as those described in WO2013/045894.

The weight ratio of ion-conducting material $I_A$ to carbon containing material $C_A$ in layer A is suitably in the range of and including 2:1 to 1:2, preferably 1:1 to 1:2.

The layer A may contain other materials such as structuring agents and reactive materials such as peroxide decomposition catalysts or oxygen evolution catalysts. Suitably, the layer A comprises no more than 10 wt % by total weight of the layer A other materials than the ion-conducting material $I_A$ and the carbon containing material $C_A$, typically no more than 5 wt %, for example no more than 1 wt %. In one aspect, the layer A consists of the ion-conducting material $I_A$ and the carbon containing material $C_A$. Examples of oxygen evolution catalysts include those disclosed in WO 2011/021034 and WO2012/080726. An oxygen evolution catalyst protects against carbon corrosion during high potential events that can occur on the anode during cell reversal, or on the cathode during start-stop cycles. Preferably, the layer A does not comprise an electrocatalyst other than an oxygen evolution catalyst. Put another way, the layer A either comprises an oxygen evolution catalyst or no electrocatalyst. Preferably, the layer A does not comprise an electrocatalyst.

The layer A preferably has a permeability $k_1$ of greater than 15 $nm^2$, more preferably greater than 20 $nm^2$. The upper limit for permeability is not particularly limited. For example, the permeability is suitably no more than 450 $nm^2$, typically no more than 250 $nm^2$, for example no more than 100 $nm^2$. Permeability in this context is calculated from mercury intrusion porosimetry measurements in accordance with the procedure set out in the examples section. In particular, mercury pressure is increased from ~3.0 to 60,000 psia during a measurement, and the porosity at <1 micron and >3 nm pore diameter is used for calculating porosity characteristics.

The layer A suitably has a thickness of no more than 15 μm, typically no more than 10 μm, preferably no more than 6 μm. The layer A suitably has a thickness of at least 1 μm, typically at least 2 μm, preferably at least 3 μm. Layer thickness can readily be determined by examining cross sections in SEM images.

Preferably, the layer A is hydrophobic. In other words, the layer A has a contact angle, as measure by water intrusion porosimetry, of at least 90°, typically at least 105°. Suitably the layer A has a contact angle of no more than 120°, typically no more than 110°. Water intrusion porosimetry measures the contact angle of water within the interior surface of the pores in the layer. Thus, the layer is hydrophobic because the interior surfaces of the pores in the layer are hydrophobic. The procedure used for water intrusion porosimetry is set out in the examples section. In particular, water pressure is increased from ~10 to 10,000 psia during a measurement.

The electrocatalyst layer has two opposing faces i.e. faces separated by the thickness of the electrocatalyst layer. A skilled person will understand thickness to mean the measurement in the through-plane, z-direction. The opposing faces extend perpendicularly to the thickness i.e. in the x-y-plane. Accordingly, the requirement that the ion-conducting membrane and the layer A are adjacent to opposite faces of the electrocatalyst layer means that they are separated by the thickness of the electrocatalyst layer. Preferably, the layer A is in contact with one face of the electrocatalyst layer, and the ion-conducting membrane is in contact with the opposite face of the electrocatalyst layer. Alternatively, the layer A is in contact with one face of the electrocatalyst layer and the ion-conducting membrane is adjacent to the opposite face, with one or more, preferably no more than one, layer(s) in between the electrocatalyst layer and the ion-conducting membrane.

The electrocatalyst layer comprises an ion-conducting material $I_B$ which, suitably, is a proton conducting ionomer which may be the same as or different to ion-conducting material $I_A$. Accordingly, the ion-conducting material may include ionomers such as perfluorosulphonic acid materials (e.g. Nafion® (Chemours Company), Aciplex® (Asahi Kasei), Aquivion® (Solvay Specialty Polymer), Flemion® (Asahi Glass Co.)), or ionomers based on partially fluorinated or non-fluorinated hydrocarbons that are sulphonated or phosphonated polymers, such as those available from FuMA-Tech GmbH as the Fumapem® P, E or K series of products, JSR Corporation, Toyobo Corporation, and others. Suitably, the ionomer is a perfluorosulphonic acid, in particular the Nafion® range available from Chemours company, especially Nafion® 1100EW, and the Aquivion® range available from Solvay, especially Solvay® 830EW.

The electrocatalyst layer also comprises an electrocatalyst. The electrocatalyst is suitably selected from:
(i) the platinum group metals (platinum, palladium, rhodium, ruthenium, iridium and osmium);
(ii) gold or silver;
(iii) a base metal;
or an alloy or mixture comprising one or more of these metals or their oxides.

A base metal is tin or a transition metal which is not a noble metal. A noble metal is a platinum group metal (platinum, palladium, rhodium, ruthenium, iridium or osmium) or gold. Suitable base metals in the alloy electrocatalyst are copper, cobalt, nickel, zinc, iron, titanium, molybdenum, vanadium, manganese, niobium, tantalum, chromium and tin. Typically, the electrocatalyst comprises a platinum group metal or an alloy of a platinum group metal. In particular, the electrocatalyst comprises platinum or an alloy of platinum with a base metal, preferably nickel or cobalt, most preferably nickel. The atomic ratio of platinum to alloying metal is typically in the range of and including 3:1 to 1:3.

The electrocatalyst may be unsupported, or supported on a support material. The term "supported" will be readily understood by a skilled person. For example, it will be understood that the term "supported" includes the electrocatalyst being bound or fixed to the support material by physical or chemical bonds. For instance, the electrocatalyst may be bound or fixed to the support material by way of ionic or covalent bonds, or non-specific interactions such as van der Waals forces.

Typically, a carbon support material is used which is preferably in powder form. The carbon material, $C_B$, may be a carbon black or a graphitised carbon black. Accordingly, the carbon support material, $C_B$, may be, for example, a commercially available carbon black (such as from Cabot Corp. (Vulcan® XC72R) or Akzo Nobel (the Ketjen® black series)) or a graphitised version of these carbon blacks or other commercially available carbon blacks such as acetylene blacks (e.g. those available from Chevron Phillips (Shawinigan Black®) or Denka). The support material $C_B$ may also be one specifically designed for use in a fuel cell, such as those described in WO2013/045894.

Alternatively, the support material may be a metal oxide or a mixed oxide, in particular a conductive mixed oxide such as niobia-doped titania, phosphorus-doped tin oxide and mixed platinum group metal oxides or mixed metal oxides (as disclosed in WO2012/080726), a carbide (e.g. tungsten carbide, molybdenum carbide or titanium carbide, suitably tungsten carbide or titanium carbide), a nitride, in particular a conductive nitride (e.g. titanium nitride or titanium aluminium nitride).

When the electrocatalyst material is supported, the loading of electrocatalyst on the support material may suitably be at least 10 wt %, typically at least 20 wt % by total weight of the electrocatalyst plus the support. The loading of the electrocatalyst may suitably be no more than 90 wt %, typically no more than 60 wt %, for example no more than 40 wt % by total weight of the electrocatalyst plus the support.

The electrocatalyst layer preferably has a permeability $k_2$ as determined by mercury intrusion porosimetry of no more than 25 nm$^2$, more preferably no more than 20 nm$^2$. The lower limit for permeability is not particularly limited. For example, the permeability is suitably at least 5 nm$^2$. Permeability in this context is calculated from mercury intrusion porosimetry measurements in accordance with the procedure set out in the examples section. In particular, mercury pressure is increased from ~3.0 to 60,000 psia during a measurement, and the porosity at <1 micron and >3 nm pore diameter is used for calculating porosity characteristics.

Suitably, the electrocatalyst layer is hydrophobic. In other words, the electrocatalyst layer has a contact angle as measured by water intrusion porosimetry of at least 90°, typically at least 105°. Suitably the electrocatalyst layer has a contact angle of no more than 120°, typically no more than 110°. Water intrusion porosimetry measures the contact angle of water within the interior surface of the pores in the electrocatalyst layer. Thus, the layer is hydrophobic because the interior surfaces of the pores in the layer are hydrophobic. The procedure used for water intrusion porosimetry is set out in the examples section. In particular, water pressure is increased from −10 to 10,000 psia during a measurement.

The electrocatalyst layer may be an anode or a cathode, preferably a proton exchange membrane fuel cell anode or cathode. Preferably the electrocatalyst layer is a cathode. The catalysed ion-conducting membrane comprises an additional catalyst containing layer present on an opposite face of the ion-conducting membrane which will be either an anode or a cathode, depending on the identity of the electrocatalyst layer defined in the invention. Accordingly, the additional catalyst containing layer is preferably an anode.

The additional catalyst layer present on the opposite face of the ion-conducting membrane may be an electrocatalyst layer as defined in the invention, along with a layer A as defined in the invention, in the arrangement described herein. Accordingly, the present invention also provides a catalysed ion-conducting membrane comprising an ion-conducting membrane having two opposing faces, and, at one face of the ion-conducting membrane, a cathode electrocatalyst layer having two opposing faces, and a layer A, wherein:

the layer A and the ion-conducting membrane are adjacent to opposite faces of the cathode electrocatalyst layer;
the layer A comprises an ion-conducting material $I_A$ and a carbon containing material $C_A$;
the cathode electrocatalyst layer comprises an ion-conducting material $I_B$ and an electrocatalyst; and
at the opposite face of the ion-conducting membrane, an anode electrocatalyst layer having two opposing faces, and a layer A, wherein:
the layer A and the ion-conducting membrane are adjacent to opposite faces of the anode electrocatalyst layer;
the layer A comprises an ion-conducting material $I_A$ and a carbon containing material $C_A$;
the anode electrocatalyst layer comprises an ion-conducting material $I_B$ and an electrocatalyst.

The thickness of the electrocatalyst layer is not particularly limited and will depend on the intended use. For example, in a fuel cell cathode, the thickness of the electrocatalyst layer may be at least 0.1 μm, suitably at least 2 μm, typically at least 5 μm. In a fuel cell cathode, the thickness may be no more than 40 μm, suitably no more than 20 μm, typically no more than 15 μm. Layer thickness can readily be determined by examining cross sections in SEM images.

The electrocatalyst loading will also depend on the intended use. In this context, electrocatalyst loading means the amount of active metal for the desired reaction in the electrocatalyst layer, for example, the amount of platinum group metal in the electrocatalyst layer when the electrocatalyst contains a platinum group metal in the form of an alloy. So, when the electrocatalyst is platinum, the electrocatalyst loading is the amount of platinum per unit area expressed as mg/cm$^2$. When the electrocatalyst is an alloy of platinum and nickel, the electrocatalyst loading is the amount of platinum per unit area expressed as mg/cm$^2$. In a fuel cell cathode the electrocatalyst loading is suitably at least 0.05 mgPt/cm$^2$, for example no more than 0.5 mgPt/cm$^2$, preferably no more than 0.3 mgPt/cm$^2$.

The electrocatalyst layer may comprise additional components. Such components include, but are not limited to: an oxygen evolution catalyst; a hydrogen peroxide decomposition catalyst; a hydrophobic additive (e.g. a polymer such as polytetrafluoroethylene (PTFE) or an inorganic solid with or without surface treatment) or a hydrophilic additive (e.g. a polymer of an inorganic solid, such as an oxide) to control reactant and water transport characteristics. The choice of additional components is within the capability of a skilled person to determine.

The ion-conducting membrane in the catalysed ion-conducting membrane of the invention has two opposing faces which are separated by the thickness of the ion-conducting membrane. A skilled person will understand thickness to mean the measurement in the through-plane, z-direction. The opposing faces extend perpendicularly to the thickness i.e. in the x-y-plane.

The ion-conducting membrane comprises an ion-conducting material which, suitably, is a proton conducting ionomer. Accordingly, the ion-conducting material may include ionomers such as perfluorosulphonic acid (e.g. Nafion® (Chemours Company), Aciplex® (Asahi Kasei), Aquivion® (Solvay Specialty Polymer), Flemion® (Asahi Glass Co.)), or ionomers based on partially fluorinated or non-fluorinated hydrocarbon that are sulphonated or phosphonated polymers, such as those available from FuMA-Tech GmbH as the Fumapem® P, E or K series of products, JSR Corporation, Toyobo Corporation, and others. Suitably, the ionomer is a perfluorosulphonic acid, in particular the Aquivion® range available from Solvay, especially Aquivion® 790EW.

The thickness of the ion-conducting membrane is not particularly limited and will depend on the intended application of the ion-conducting membrane. For example, typical fuel cell ion-conducting membranes have a thickness of at least 5 μm, suitably at least 8 μm, preferably at least 10 μm. Typical fuel cell ion-conducting membranes have a thickness of no more than 50 μm, suitably no more than 30 μm, preferably no more than 20 μm. Accordingly, typical fuel cell ion-conducting membranes have a thickness in the range of and including 5 to 50 μm, suitably 8 to 30 μm, preferably 10 to 20 μm. Layer thickness can readily be determined from examination of cross sections in SEM images.

The ion-conducting membrane may comprise additional components such as peroxide decomposition catalysts and/or radical decomposition catalysts, and/or recombination catalysts. Recombination catalysts catalyse the recombination of unreacted $H_2$ and $O_2$ which can diffuse into the ion-conducting membrane from the anode and cathode of a fuel cell respectively, to produce water. The ion-conducting membrane may also comprise a reinforcement material, such as a planar porous material (for example expanded polytetrafluoroethylene (ePTFE) as described in USRE37307), embedded within the thickness of the ion-conducting membrane, to provide for improved mechanical strength of the ion-conducting membrane, such as increased tear resistance and reduced dimensional change on hydration and dehydration, and thus further increase the durability of a membrane electrode assembly and lifetime of a fuel cell incorporating the catalysed ion-conducting membrane of the invention. Other approaches for forming reinforced ion-conducting membranes include those disclosed in U.S. Pat. Nos. 7,807,063 and 7,867,669 in which the reinforcement is a rigid polymer film, such as polyimide, into which a number of pores are formed and then subsequently filled with the PFSA ionomer. Graphene particles dispersed in an ion-conducting polymer layer may also be used as a reinforcement material.

Any reinforcement present may extend across the entire thickness of the ion-conducting membrane or may extend across only a part of the thickness of the ion-conducting membrane. It will be understood that the thickness of the ion-conducting membrane extends perpendicular to the face of the ion-conducting membrane, e.g. it is in the through plane z-direction. It may further be advantageous to reinforce the perimeter of the first and second surface of the ion-conducting membrane to a greater extent than the central face of the first and second surface of the ion-conducting membrane. Conversely, it may be desirable to reinforce the centre of the first or second surface of the ion-conducting membrane to a greater extent than perimeter of the first or second surface of the ion-conducting membrane.

In the methods of the invention, the catalysed ion-conducting membrane of the invention is prepared using inks—a layer A ink and an electrocatalyst layer ink. As is readily evident to a skilled person, a layer A ink becomes a layer A when it has been dried, and an electrocatalyst layer ink becomes an electrocatalyst layer when it has been dried. A layer of layer A ink, or a layer of electrocatalyst ink, is a layer of the ink which has not been dried.

A skilled person is capable of preparing such inks, and as such the method of preparing the inks is not particularly limited. For example, to prepare the layer A ink, ion-conducting material $I_A$, carbon material $C_A$ and any additional components are dispersed in an aqueous and/or organic solvent. If required, agglomerate particle break-up is carried out by methods known in the art such as high shear mixing, milling, ball milling, passing through a microfluidiser etc. or a combination thereof. Suitable solvents include alcohol based solvents, including mixtures of such solvents with water, such as for example propan-1-ol:water, e.g. 22 wt % propan-1-ol/water. To prepare the electrocatalyst layer ink, ion-conducting material $I_B$, the electrocatalyst (supported or unsupported) and any additional components are dispersed in an aqueous and/or organic solvent. If required, agglomerate particle break-up is carried out by methods known in the art such as high shear mixing, milling, ball milling, passing through a microfluidiser etc. or a combination thereof. Suitable solvents include alcohol based solvents, including mixtures of such solvents with water, such as for example propan-1-ol:water, e.g. 22 wt % propan-1-ol/water.

The layer A ink is dried to provide a layer A, for example the layer A ink is heated to a temperature in the range of and including 100 to 300° C., suitably 200 to 250° C. for a sufficient period of time. The drying method is not particularly limited, and a skilled person will be able to identify a suitable method. The electrocatalyst layer ink is dried to provide an electrocatalyst layer, for example the electrocatalyst ink is heated to temperature in the range of and including 100 to 250° C., suitably 150 to 200° C. Drying also has the function of annealing the layers. In the method of the invention, the first ink to be deposited need not be dried before the second ink is applied. In other words, the second ink to be applied may be applied to a pre-formed and dried layer A or electrocatalyst layer, or it may be applied to a still wet application of the layer A ink or the electrocatalyst layer ink.

When the electrocatalyst layer ink is applied to a substrate first, the substrate is preferably the ion-conducting membrane. The layer A ink is then applied to a layer of the electrocatalyst layer ink, or an electrocatalyst layer (after drying of the electrocatalyst layer ink) before being dried to form a layer A. Accordingly, the present invention provides a method for preparing the catalysed ion-conducting membrane of the invention, the method comprising the steps of:

i) applying an electrocatalyst layer ink onto an ion-conducting membrane and then drying the ink to form an electrocatalyst layer;

ii) applying a layer A ink onto an electrocatalyst layer then drying the ink to form a layer A;

wherein the electrocatalyst layer ink comprises an ion-conducting material $I_B$ and an electrocatalyst; and the layer A ink comprises an ion-conducting material $I_A$ and a carbon containing material $C_A$.

Alternatively, in step ii), the layer A ink may be applied to a still wet application of the electrocatalyst layer ink. So, alternatively, the ink applied in step i) is not dried before step ii) and the layer A ink is applied in step ii) to a layer of the electrocatalyst layer ink.

Preferably, the layer A ink is applied to a substrate first, then preferably dried to form a layer A (although drying at this stage is not required) before applying an electrocatalyst ink to the layer (either a layer A or a layer of layer A ink) and drying to form an electrocatalyst layer. The combined layers may suitably be combined with an ion-conducting membrane such that the electrocatalyst layer is adjacent to the ion-conducting membrane. Accordingly, the present invention provides a method of preparing a catalysed ion-conducting membrane according to the invention, the method comprising the steps of:

i) applying a layer A ink comprising ion-conducting material $I_A$ and carbon containing material $C_A$ onto a substrate then drying the ink to form a layer A; then ii) applying an electrocatalyst layer ink comprising ion-conducting material $I_B$ and an electrocatalyst onto the layer A formed in step i) then drying the ink to form an electrocatalyst layer;

iii) combining the layers with an ion-conducting membrane such that the electrocatalyst layer is adjacent to the ion-conducting membrane. The substrate to which the layer A ink is applied may suitably be a decal transfer substrate.

Alternatively, in step ii), the electrocatalyst layer ink may be applied to a still wet application of the layer A ink. So, alternatively, the ink applied in step i) is not dried before step ii) and the electrocatalyst layer ink is applied in step ii) to a layer of the layer A ink.

The decal transfer used in the invention may be formed from any suitable material from which the electrocatalyst layer can be removed without damage thereto and it is within the capability of a skilled person to be able to select a decal transfer substrate. Examples of suitable materials include a fluoropolymer, such as polytetrafluoroethylene (PTFE), ethylene tetrafluoroethylene (ETFE), perfluoroalkoxy polymer (PFA), fluorinated ethylene propylene (FEP—a copolymer of hexafluoropropylene and tetrafluoroethylene) and polyolefins, such as biaxially orientated polypropylene (BOPP).

The membrane electrode assembly of the invention comprises a catalysed ion-conducting membrane according to the invention which includes the electrocatalyst layer as defined herein, along with a layer A as defined herein, in the arrangement described herein at either one or both faces of the ion-conducting membrane, preferably one, which is preferably the cathode, preferably of a proton exchange membrane fuel cell. The membrane electrode assembly comprises a gas diffusion layer at each face.

The present invention also provides a method of preparing a membrane electrode assembly of the invention comprising a catalysed ion-conducting membrane of the invention, the method comprising the steps of:

i) applying an electrocatalyst layer ink onto an ion-conducting membrane and then drying the ink to form an electrocatalyst layer then ii) applying a layer A ink onto the electrocatalyst layer then drying the ink to form a layer A;

wherein the electrocatalyst layer ink comprises an ion-conducting material $I_B$ and an electrocatalyst; and the layer A ink comprises an ion-conducting material $I_A$ and a carbon containing material $C_A$.

A gas diffusion layer is subsequently applied to the layer A.

Alternatively, in step ii), the layer A ink may be applied to a still wet application of the electrocatalyst layer ink. So, alternatively, the ink applied in step i) is not dried before step ii) and the layer A ink is applied in step ii) to a layer of the electrocatalyst layer ink.

Additionally, the present invention provides a method for preparing a membrane electrode assembly of the invention comprising a catalysed ion-conducting membrane according to the invention, the method comprising the steps of:

i) applying a layer A ink comprising ion-conducting material $I_A$ and carbon containing material $C_A$ onto a substrate then drying the ink to form a layer A; then ii) applying an electrocatalyst layer ink comprising ion-conducting material $I_B$ and an electrocatalyst onto the layer A formed in step i) then drying the ink to form an electrocatalyst layer; then iii) combining the layers with an ion-conducting membrane such that the electrocatalyst layer is adjacent to the ion-conducting membrane. The substrate to which the layer A ink is applied may suitably be a decal transfer substrate or a gas diffusion layer.

Alternatively, in step ii), the electrocatalyst layer ink may be applied to a still wet application of the layer A ink. So, alternatively, the ink applied in step i) is not dried before step ii) and the electrocatalyst layer ink is applied in step ii) to a layer of the layer A ink.

When the substrate to which the layer A ink is applied is a gas diffusion layer, the layer A ink is applied to the microporous layer, if present on the gas diffusion layer. After application of the electrocatalyst layer ink to the layer A to form a gas diffusion electrode, the combined layers are then combined with the ion-conducting membrane, such that the electrocatalyst layer is adjacent to the ion-conducting membrane.

When the substrate to which the layer A ink is applied is a decal transfer substrate, the decal transfer substrate is removed from the layer A after step iii). In that case, a gas diffusion layer may subsequently be added.

Preferably, the combined layers are combined directly with the ion-conducting membrane such that the electrocatalyst layer is in contact with the ion-conducting membrane.

The gas diffusion layer comprises a gas diffusion substrate and, optionally a microporous layer. Preferably, the gas diffusion layer comprises a microporous layer. Typical gas diffusion substrates include non-woven papers or webs comprising a network of carbon fibres and a thermoset resin binder (e.g. the TGP-H series of carbon fibre paper available from Toray Industries Inc., Japan or the H2315 series available from Freudenberg FCCT KG, Germany, or the Sigracet® series available from SGL Technologies GmbH, Germany or AvCarb® series from AvCarb Material Solutions LLC), or woven carbon cloths. The carbon paper, web or cloth may be provided with a pre-treatment prior to fabrication of the electrode and being incorporated into a membrane electrode assembly either to make it more wettable (hydrophilic) or more wet-proofed (hydrophobic). The nature of any treatments will depend on the type of fuel cell and the operating conditions that will be used. The substrate can be made more wettable by incorporation of materials such as amorphous carbon blacks via impregnation from liquid suspensions, or can be made more hydrophobic by impregnating the pore structure of the substrate with a colloidal suspension of a polymer such as PTFE or polyfluoroethylenepropylene (FEP), followed by drying and heating above the melting point of the polymer. A microporous layer may also be applied to the gas diffusion substrate on the face that will contact the layer A. The microporous layer typically comprises a mixture of a carbon black and a polymer such as polytetrafluoroethylene (PTFE). The addition of a microporous layer is especially preferred for applications such as the proton exchange membrane fuel cell.

FIG. 1 shows a schematic of a preferred method according to the invention. A layer A ink is applied to a PTFE decal transfer substrate and dried, before application of a cathode electrocatalyst layer ink and drying. The combined layers are then transferred to an ion-conducting membrane which either already comprises an anode, or to which an anode will be added subsequently.

EXAMPLES

Preparation of Layer A Inks

Layer A ink was fabricated by mixing 2 g of carbon powder with 7.07 g aqueous Solvay 830EW ionomer solution (Aquivion, 25 wt %) using a spatula to ensure the carbon powder was fully wetted. 2.85 g of neat propan-1-ol and 4.82 g of water were added to the mixture to achieve a 22 wt % propan-1-ol/water ratio in the solvent mix and stirred well. The ionomer content in the carbon ink was 90 wt % with respect to weight of carbon. The mixture was processed in a Speedmixer™ DAC 150 FVZ-K with 10, 5 mm diameter YTZ® beads until optimum particle break-up was achieved. The ink processing was stopped and stirred after 5 minutes to avoid overheating the ink during processing.

Two different layer A inks were prepared, each containing a different carbon. Layer A 1 (LA1) ink contained a carbon specifically designed for use in fuel cells, as described in WO2013/045894. Layer A 2 (LA2) ink contained Ketjen EC-300J.

Preparation of Electrocatalyst Layer Inks
Carbon Supported Pt Electrocatalysts

Electrocatalyst layer ink EL1 was fabricated by mixing 2.5 g of 30 wt % Pt supported on carbon black (which was prepared using a method analogous to the general method of preparation of carbon supported Pt catalysts described in WO 2013/045894) with 13.47 g aqueous Nafion 1100EW solution (DuPont, 10-12 wt %) using a spatula to ensure the electrocatalyst powder was fully wetted prior to adding propan-1-ol solvent. 3.35 g of neat propan-1-ol was added to the mixture to achieve 22 wt % propan-1-ol/water ratio in the solvent mix and stirred well. The ionomer content in the cathode ink was 90 wt % with respect to the weight of carbon. The mixture was processed in a Speedmixer™ DAC 150 FVZ-K with 10, 5 mm diameter YTZ® beads until optimum particle break-up was achieved. The ink processing was stopped and stirred after 5 minutes to avoid overheating the ink during processing. The processed ink was further diluted to a suitable ink solids content to allow the coating process to achieve the target Pt loading in the electrocatalyst layer.

Carbon Supported Ft/Ni Catalysts

Electrocatalyst layer inks EL2, EL3, EL4 and EL5 were fabricated by mixing 2 g of a carbon black supported nanoparticle Pt/Ni alloy material (electrocatalyst powder) with an amount of aqueous Nafion 1100EW solution (DuPont, 10-12 wt %) to provide 80 to 90% mass of ionomer with respect to the mass of carbon in the electrocatalyst powder. The amount of metal in the electrocatalyst material was assayed using inductively coupled plasma mass spectrometry; the mass of carbon being calculated from the difference in the total mass and the mass of metal. A spatula was used to ensure the electrocatalyst powder was fully wetted prior to propan-1-ol solvent addition. Neat propan-1-ol was added to the mixture to achieve 22 wt % propan-1-ol/water ratio in the solvent mix and stirred well. The mixture was processed in a Speedmixer™ DAC 150 FVZ-K with 10, 5 mm diameter YTZ® beads until optimum particle break-up was achieved. The ink processing was stopped and stirred after 5 minutes to avoid overheating the ink during processing. The processed ink was then diluted with 22 wt % propan-1-ol/water to a suitable ink solids content to allow the coating process to achieve the target Pt loading in the electrocatalyst layer.

The electrocatalyst in the EL2 ink was 30% $Pt_{1.8}Ni$ on carbon, the carbon being specifically designed for use in fuel cells, as described in WO2013/045894. The electrocatalyst in the EL3 ink was 44% $Pt_{1.8}Ni$ on carbon, prepared by the general method disclosed in WO 2017/129982. The electrocatalyst in the EL4 ink was 40% $Pt_{3.5}Ni$ on carbon, prepared by the general method disclosed in WO 2017/129982. The electrocatalyst in the EL5 ink was 30% $Pt_{2.1}Ni$ on carbon, wherein the carbon was Ketjen EC-300J.

Preparation of Catalysed Ion-Conducting Membranes

Comparative Examples (No Layer A)

Catalysed ion-conducting membranes of 50 cm² active area were prepared by depositing anode and cathode layers onto a PTFE sheet and transferring the appropriate layers to either side of a PFSA reinforced membrane (17 μm thickness) by lamination at a temperature of between 150° C. and 200° C. Electrocatalyst layer inks of the invention were used to form the cathode electrocatalyst layer; the anode electrocatalyst layer in each catalysed ion-conducting membrane comprised an anode electrocatalyst (HiSPEC® 9100 with a nominal Pt loading of 60 wt % Pt on the carbon support) at a loading of 0.1 mgPt/cm².

Examples (Including a Layer A)

Preparation 1

Catalysed ion-conducting membranes of 50 cm² active area were prepared by first depositing a layer A ink onto a PTFE sheet, drying and annealing (200-250° C.). Then, an electrocatalyst layer ink was printed on top of the dried layer A, dried and annealed (150-200° C.). The combined layers were then transferred to one side of a PFSA reinforced membrane (20 μm thickness), and an anode layer was transferred from a PTFE sheet onto the other side, by lamination at a temperature of between 150° C. to 200° C. The anode layer in each catalysed ion-conducting membrane comprised an anode electrocatalyst (HiSPEC® 9100 with a nominal Pt loading of 60 wt % Pt on the carbon support) at a loading of 0.1 mgPt/cm².

Preparation 2

Catalysed ion-conducting membranes of 50 cm² active area were prepared by first depositing a layer A ink onto the microporous layer of a gas diffusion layer, drying and annealing (200-250° C.). The gas diffusion layer used was a carbon fibre paper with a hydrophobic microporous layer containing carbon and PTFE. Then, an electrocatalyst layer ink was printed on top of the dried layer A, dried and annealed (150-200° C.). The combined layers were then transferred to a side of a PFSA reinforced membrane (17 μm thickness). and an anode layer was transferred from a PTFE sheet onto the other side, by lamination at a temperature of between 150° C. to 200° C. The anode layer in each catalysed ion-conducting membrane comprised an anode electrocatalyst (HiSPEC® 9100 with a nominal Pt loading of 60 wt % Pt on the carbon support) at a loading of 0.1 mgPt/cm².

Preparation of Membrane Electrode Assemblies

A gas diffusion layer was applied to the faces of each catalysed ion-conducting membrane as required to form the complete membrane electrode assembly. The gas diffusion layer used was a carbon fibre paper with a hydrophobic microporous layer containing carbon and PTFE applied to the face in contact with the catalysed ion-conducting membrane.

Membrane Electrode Assembly Performance Testing

The polarisation (current vs voltage) performance of the 50 cm² membrane electrode assemblies was measured in H₂/air at 80° C. under fully humidified and pressurised (100% RH, 100 kPag) conditions and under drier (30% RH) conditions using H₂ and air flows both at a stoichiometry of 2.0. To check for any differences in the kinetic behaviour of the cathode catalysts, polarisation curves were also recorded using pure oxygen as the oxidant on the cathode side under the same temperature and pressure and hydrogen stoichiometry, but the oxygen stoichiometry used was 10.0. In all measurements, the cell humidity (RH) and pressure was controlled at the anode and cathode inlets. Temperature sweeps were performed by fixing the dew point of the hydrogen and air at the cell inlets at 53° C. and controlling the cell temperature at different points between about 38° C. to 91° C.

Modal Pore Size, Total Pore Volume and Permeability—Mercury Intrusion Porosimetry Measurements The electrocatalyst layers or layers A to be measured were supported either on ion-conducting membrane or on thin PTFE sheets. The layers to be measured were cut into strips which were stacked and rolled prior to loading into a specialised sample holder known as a penetrometer. The penetrometer containing the strips was mounted into a Micromeritics Autopore IV 9520 mercury porosimeter and the mercury pressure increased from ~3.0 to 60,000 psia in small steps, with accompanying measurements of the volume of mercury intruded into the sample, derived from capacitance changes measured along the stem of the penetrometer. The pore size distribution was then calculated from the Washburn equation, assuming a contact angle for Hg of 130°, which relates the applied pressure to the diameter of the pores into which mercury is intruded, thereby giving the amount of porosity in pores from ~60 microns to 3 nm in diameter. The intrusion curves were corrected for ion-conducting membrane or PTFE compression by measuring samples of the bare ion-conducting membrane, or bare PTFE, in the penetrometer over the same pressure range (~3.0 to 60,000 psia). The resulting apparent volume of intrusion, due to ion-conducting membrane or PTFE compression, was subtracted from the data for the catalysed ion-conducting membrane or PTFE-supported layers to ensure that no apparent pore volume due to ion-conducting membrane or PTFE compression was assigned to the electrocatalyst layers or layers A.

The porosity at <1 micron and >3 nm pore diameter is selected as the appropriate pore size range for calculating porosity characteristics in the layers of this invention. This avoids misleading information from large, inhomogeneous features such as cracks or voids. The pore volume fraction and permeability are calculated from the mercury intrusion porosity data at <1 micron and >3 nm pore diameter as follows:

Pore Volume Fraction:

$$\phi = \frac{\text{Total pore volume}}{\text{Total volume of catalyst layer}}$$

The volume of the catalyst layer is calculated from the area measured and the catalyst layer thickness. The thickness can be calculated by those skilled in the art from mercury intrusion porosimetry of the catalyst powder and knowledge of the ink composition. Alternatively, it can readily be determined from examination of cross sections in SEM images.

Permeability:

$$k = \frac{\phi d^2}{32}$$

Where k=permeability
ϕ=pore volume fraction
d=pore diameter (in nm) at the median intrusion volume, for pores at <1 micron and >3 nm pore diameter (i.e. the pore diameter at which half the volume of the porosity, <1 micron and >3 nm pore diameter, is filled with mercury).

Figure 10:
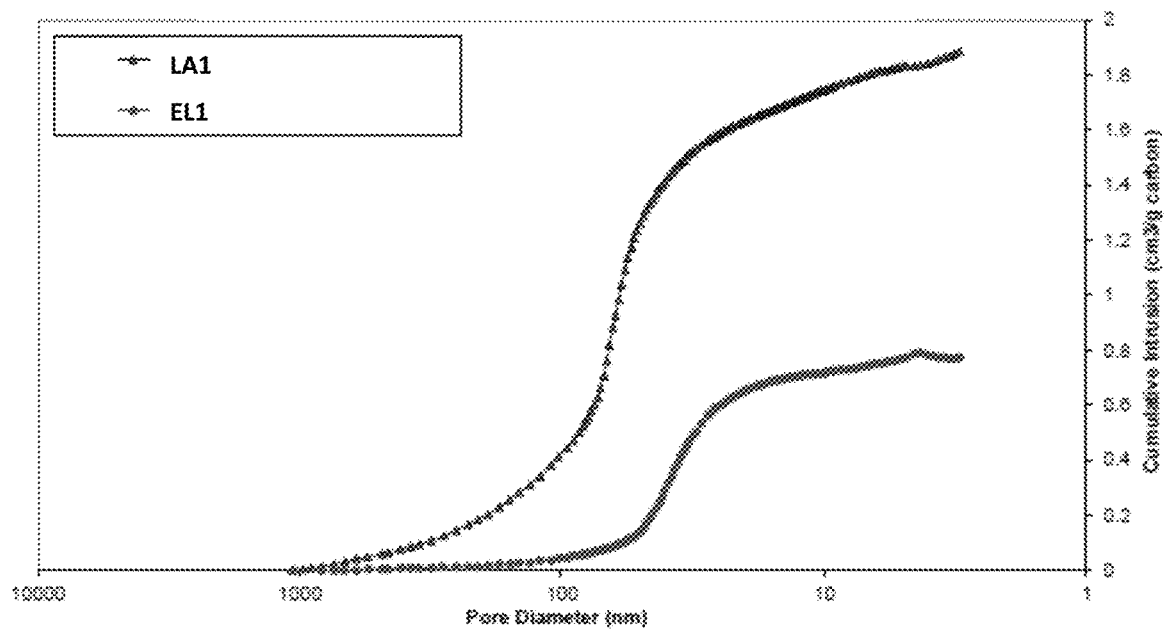
FIG. 10 shows a cumulative intrusion trace for pores smaller than 1 micron diameter as measured by mercury intrusion porosimetry for a layer A and an electrocatalyst layer containing a Pt electrocatalyst.
Figure 11:
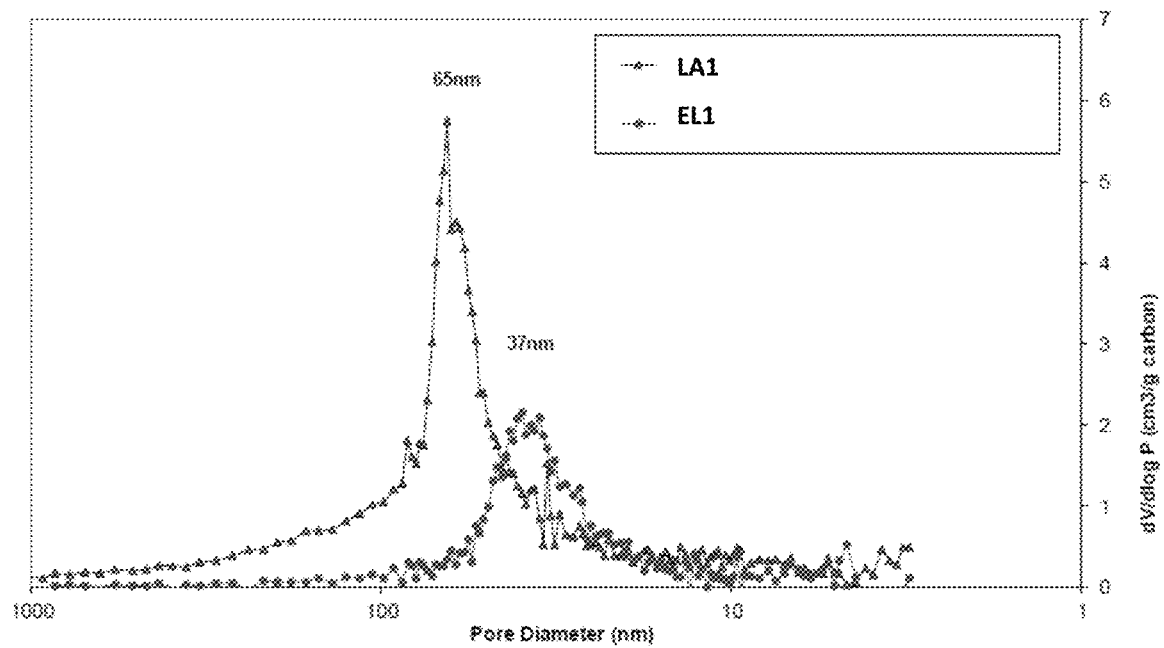
FIG. 11 shows a differential intrusion trace for pores smaller than 1 micron diameter as measured by mercury intrusion porosimetry for a layer A and an electrocatalyst layer containing a Pt electrocatalyst, showing modal pore diameter.

FIGS. 10 and 11 show data extracted from mercury intrusion porosimetry measurements carried out on the electrocatalyst layer and layer A in Example 2, which are used to calculate permeability by the method discussed above.

Figure 12:
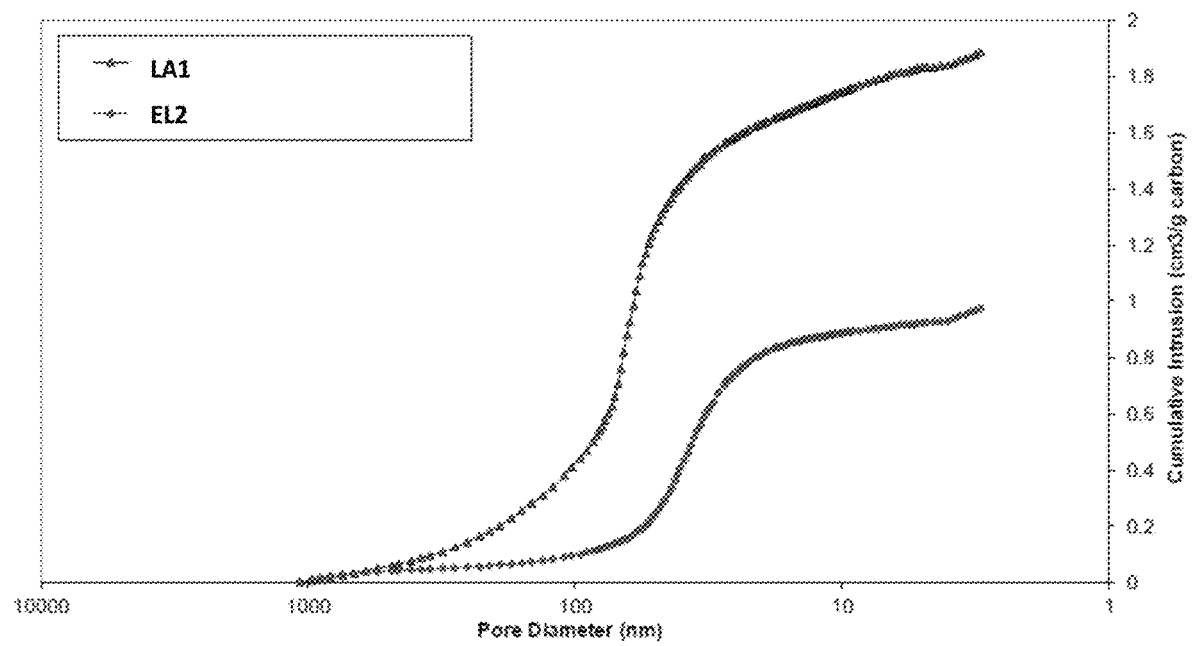
FIG. 12 shows a cumulative intrusion trace for pores smaller than 1 micron diameter as measured by mercury intrusion porosimetry for a layer A and an electrocatalyst layer containing a Pt/Ni alloy electrocatalyst.
Figure 13:
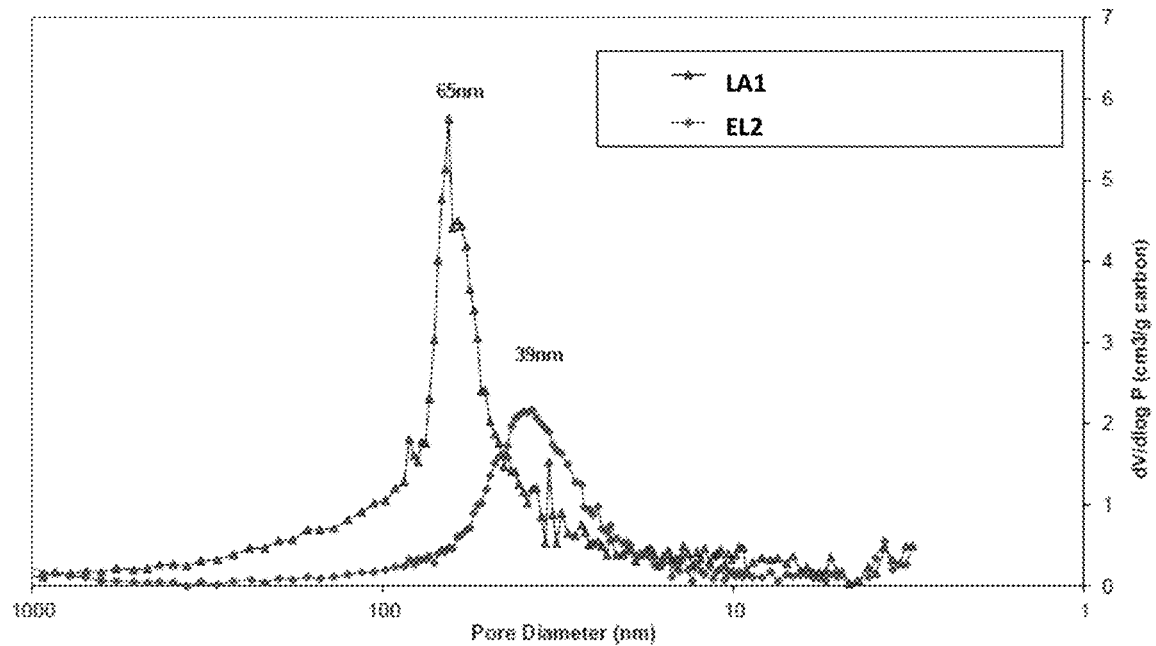
FIG. 13 shows a differential intrusion trace for pores smaller than 1 micron diameter as measured by mercury intrusion porosimetry for a layer A and an electrocatalyst layer containing a Pt/Ni alloy electrocatalyst. Modal pore diameter is provided.

FIGS. 12 and 13 show data extracted from mercury intrusion porosimetry measurements carried out on the electrocatalyst layer and layer A in Example 1, which are used to calculate permeability by the method discussed above.

SEM Imaging of Cross Sections

Figure 9:
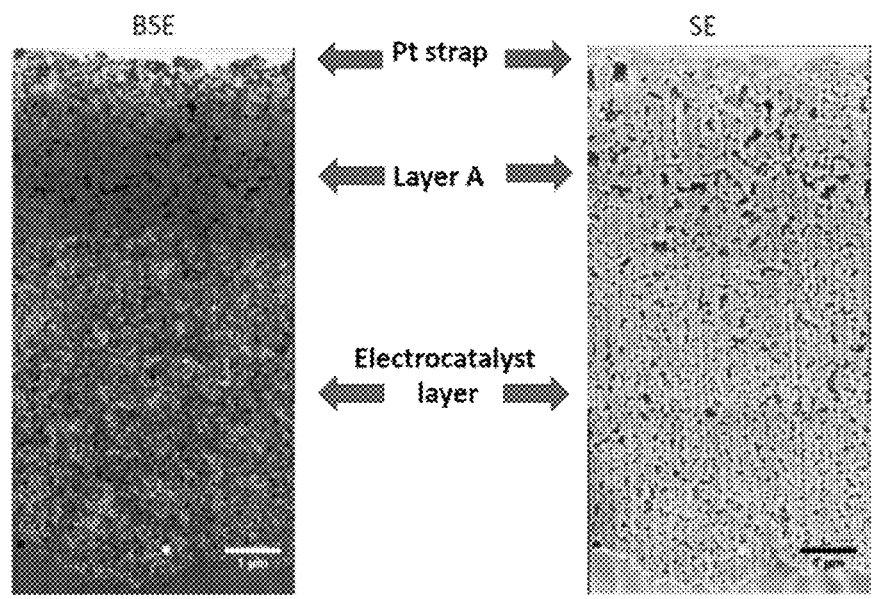
FIG. 9 shows a cross section prepared by focused ion beam milling imaged in a scanning electron microscope (SEM) in both secondary electron (SE) and back-scattered-electron (BSE) modes, showing a portion of a catalysed ion-conducting membrane of the invention, showing layer A and the electrocatalyst layer.

FIG. 9 shows scanning electron microscope (SEM) images, secondary electron (SE) and back-scattered-electron (BSE), of part of a cross section of a catalysed ion-conducting membrane of the invention, in which the electrocatalyst layer and the layer A are clearly identifiable. The electrocatalyst layer appears brighter in the BSE mode due to the presence of Pt, which has a high atomic number. These types of cross-sections were created using a Zeiss Auriga focused ion beam (FIB) instrument operated at 30 kV. A Pt strap was deposited on the surface of the specimen to protect the top surface during the cross-sectioning process. SEM imaging was performed using a Zeiss Ultra 55 SEM equipped with in-lens secondary electron and backscattered detectors, and a Bruker XFlash® 61100 EDX detector. High resolution SEM images were acquired using an accelerating voltage of 1.4 kV.

Contact Angle—Water Intrusion Porosimetry Measurements

The water contact angle with the interior walls of the pores within the electrocatalyst layers and the layer A layers was measured using water intrusion porosimetry following the method of A. Y. Fadeev and V. A. Eroshenko, J. Col. and Int. Sci., 187, 275-282, 1997, which is incorporated herein by reference in its entirety. This contact angle shows how hydrophobic the surface of the pore wall is, with a value of 90° indicating a surface that is only just hydrophobic and a value of 110° indicating a very hydrophobic surface. Water intrusion porosimetry can be carried out using commercial instruments such as the Aquapore 30K-A-1 made by Porous Materials Inc. or using instruments of the type described by Fadeev and Eroshenko. Measurements require the sample to be completely immersed in water and pressure applied to the water such that it is forced into the pores of the material in the same manner as for mercury intrusion porosimetry. By measuring the applied pressure and the volume of water intruded into the sample a pressure-volume curve is obtained. Samples were presented as electrocatalyst layers or as layer A layers supported on ion-conducting membrane or on PTFE sheet. Because the viscosity of water is much lower than that of mercury, much lower pressures are needed for intrusion and no correction for ion-conducting membrane of PTFE compression is needed. The water pressure range used was from 10 to 10,000 psia. The intrusion curves were corrected for ion-conducting membrane or PTFE compression by measuring samples of the bare ion-conducting membrane, or bare PTFE, in the sample holder over the same pressure range (~10 to 10,000 psia). The resulting apparent volume of intrusion, due to ion-conducting membrane or PTFE compression, was subtracted from the data for the catalysed ion-conducting membrane or PTFE-supported layers to ensure that no apparent pore volume due to ion-conducting membrane or PTFE compression was assigned to the electrocatalyst layers or layers A.

A typical contact angle for water within the hydrophobic pores of the material can then be calculated from a comparison of the pressures at which the modal intrusions occur for mercury (Pm) using mercury intrusion porosimetry and for water (Pw) using water intrusion porosimetry, in the same type of porous layer, by plotting the differential of the pressure-volume curves (dV/dlogP) against the intrusion pressure for each fluid and reading the modal pressure value for each intruded liquid (water and mercury). The modal pore size occurs at the peak of this curve. The contact angle for water is then calculated from the Washburn equations using the two values for the modal pressure from each intrusion experiment (water and mercury), re-arranged such that:

$$\cos \theta_w = \gamma_m \cdot \cos \theta_m \cdot P_w / \gamma_w \cdot P_m$$

Where $\theta_w$ is the contact angle of water with the pore walls, $\theta_m$ is the contact angle of mercury with the pore walls (130°), Pw is the modal pressure for water, Pm is the modal pressure for mercury, $\gamma_m$ is the surface tension of mercury ($40.7 \times 10^{-2}$ N/m) and $\gamma_w$ is the surface tension of water ($7.28 \times 10^{-2}$ N/m) at 293K.

Comparative Examples

TABLE 1

| No. | Electrocatalyst layer ink | Catalyst loading mgPt/cm$^2$ |
|---|---|---|
| 1 | EL2 | 0.1 |
| 2 | EL1 | 0.1 |
| 3 | EL3 | 0.2 |
| 4 | EL4 | 0.2 |
| 5 | EL1 | 0.2 |
| 6 | EL5 | 0.1 |

Examples

TABLE 2

| No. | Electrocatalyst layer ink | Layer A ink | Preparation method | Pt loading in Electrocatalyst Layer mgPt/cm$^2$ |
|---|---|---|---|---|
| 1 | EL2 | LA1 | 1 | 0.1 |
| 2 | EL1 | LA1 | 1 | 0.1 |
| 3 | EL2 | LA1 | 1 | 0.1 |
| 4 | EL2 | LA2 | 1 | 0.1 |
| 5 | EL3 | LA1 | 1 | 0.2 |
| 6 | EL4 | LA1 | 1 | 0.2 |
| 7 | EL5 | LA1 | 2 | 0.1 |
| 8 | EL5 | LA1 | 1 | 0.1 |

Results and Discussion

Figure 2:
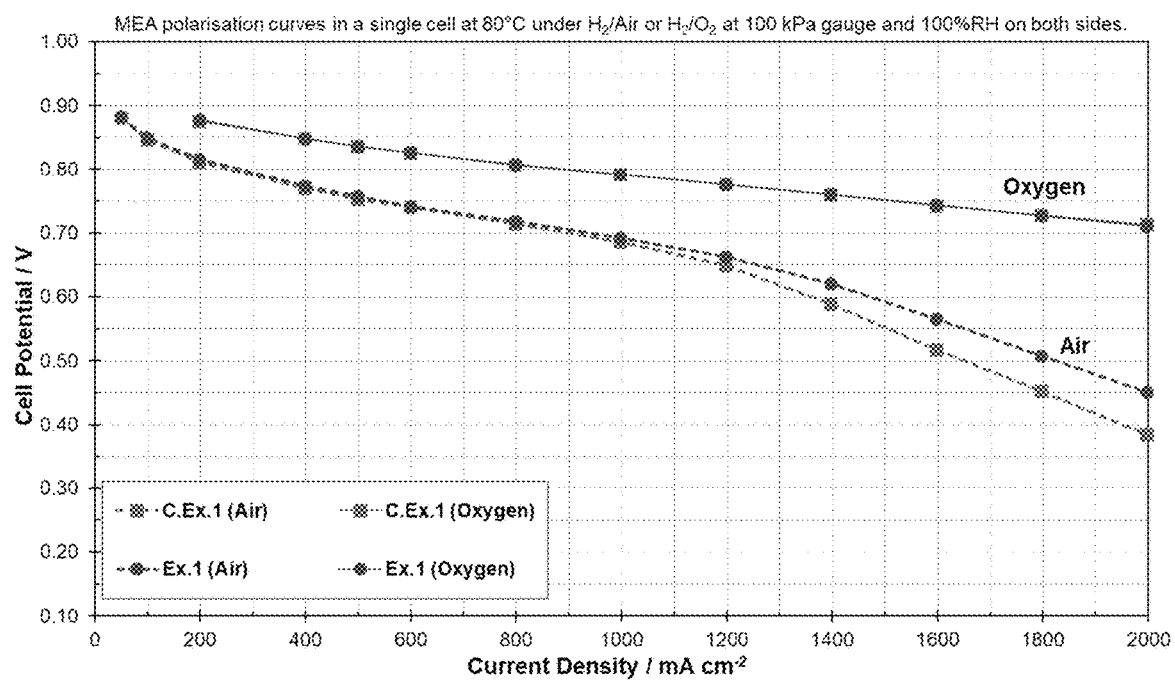
FIG. 2 is a plot showing voltage versus current density for a membrane electrode assembly comprising a catalysed ion-conducting membrane of the invention, and a membrane electrode assembly comprising a comparative catalysed ion-conducting membrane having no layer A.

Table 3 gives the voltage at 1.8 A/cm$^2$ (high current density) from the polarisation curves recorded under fully humidified conditions (100% relative humidity, FIG. 2), and under drier conditions (30% relative humidity) for Example 1 and Comparative Example 1, which both comprise a Pt/Ni electrocatalyst layer.

TABLE 3

| | 1.8 A/cm$^2$ 100% RH, mv | 1.8 A/cm$^2$ 30% RH mv |
|---|---|---|
| Comp. Example 1 | 453 | 422 |
| Example 1 | 508 | 564 |
| Gain, mV | +55 | +43 |

It can be seen that the inclusion of the layer A in Example 1 leads to a marked improvement in performance under both wet and dry conditions.

Table 4 provides some properties of the layers in Example 1

TABLE 4

| | Permeability nm$^2$ | Contact angle ° | Layer thickness μm |
|---|---|---|---|
| LA1 layer | 63 | 106 | 5.3 |
| EL2 layer | 19 | 109 | 4.4 |

Figure 3:
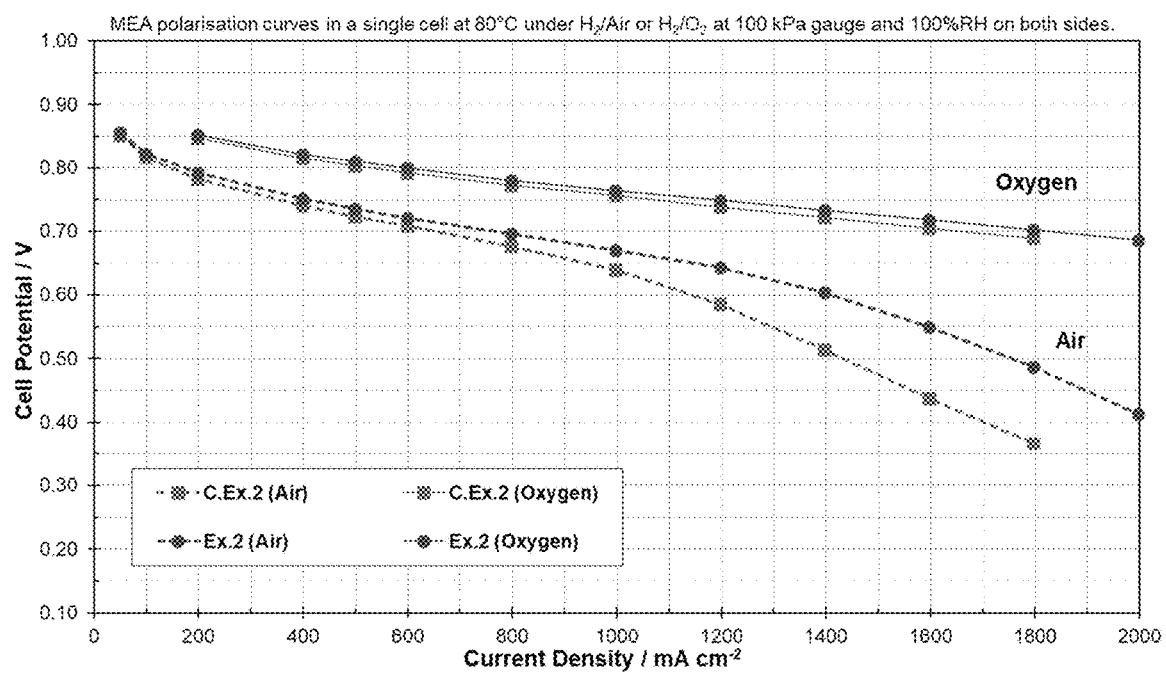
FIG. 3 is a plot showing voltage versus current density for a membrane electrode assembly comprising a catalysed ion-conducting membrane of the invention, and a membrane electrode assembly comprising a comparative catalysed ion-conducting membrane having no layer A.

Table 5 gives the voltage at 1.8 A/cm$^2$ (high current density) from the polarisation curve under fully humidified conditions (100% relative humidity, FIG. 3), and under drier conditions (30% relative humidity) for Example 2 and Comparative Example 2, which both comprise a Pt electrocatalyst layer.

TABLE 5

| | 1.8 A/cm$^2$ 100% RH, mV | 1.8 A/cm$^2$ 30% RH, mV |
|---|---|---|
| Comp. Example 2 | 366 | 365 |
| Example 2 | 486 | 452 |
| Gain, mV | +120 | +87 |

It can be seen that the inclusion of the layer A in Ex. 2 leads to a marked improvement in performance under both wet and dry conditions.

Table 6 provides some properties of the layers in Example 2.

TABLE 6

| | Permeability nm$^2$ | Contact angle ° | Layer thickness μm |
|---|---|---|---|
| LA1 layer | 63 | 106 | 5.3 |
| EL1 layer | 16 | 108 | 5.0 |

Figure 4:
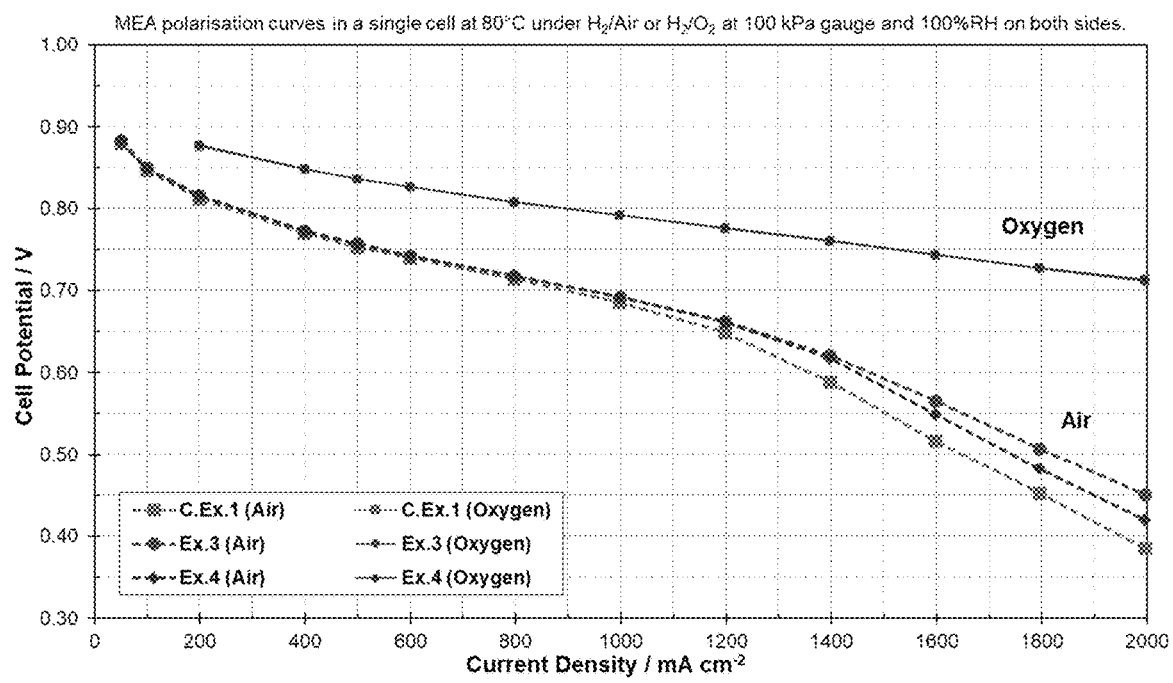
FIG. 4 is a is a plot showing voltage versus current density for membrane electrode assemblies comprising catalysed ion-conducting membranes of the invention with different carbon containing materials $C_A$ in layer A, and a membrane electrode assembly comprising a comparative catalysed ion-conducting membrane having no layer A.

FIG. 4 shows polarisation curves for Comparative Example 1, Example 3 and Example 4. The layer A in Example 3 is different from the layer A in Example 4. All three of these examples have Pt/Ni alloy electrocatalysts in the electrocatalyst layer. Example 3 and 4 both show an improvement in performance at high current densities.

Figure 5:
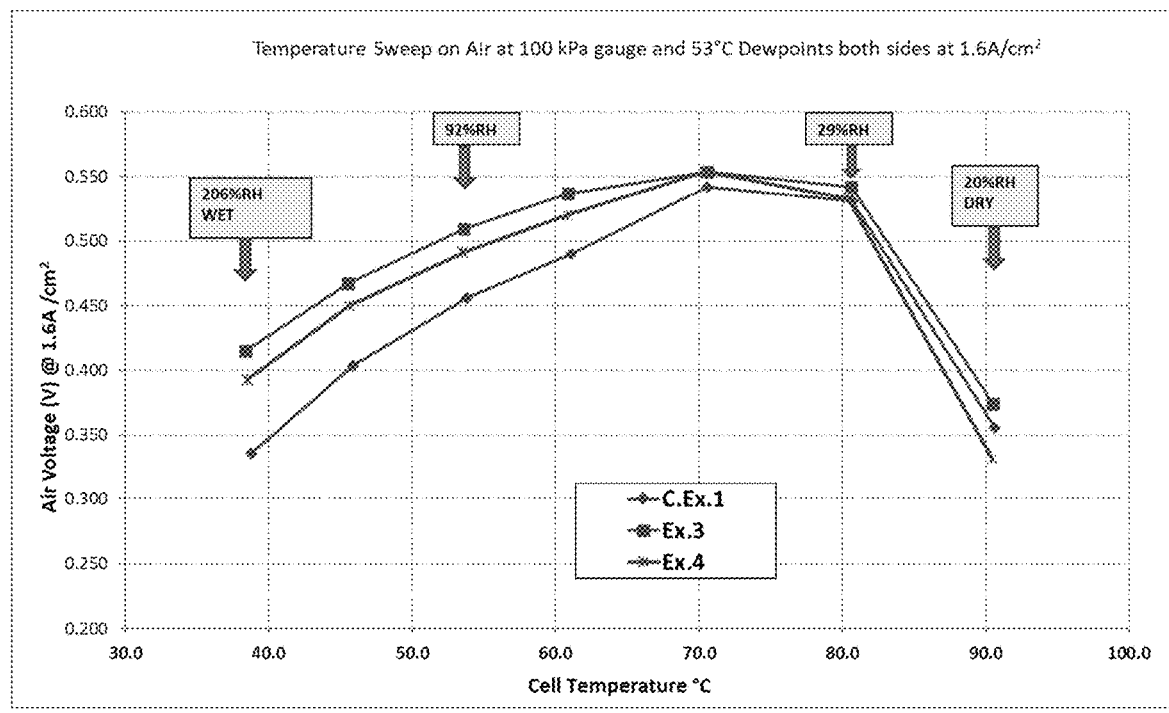
FIG. 5 is a temperature sweep at 1.6 A/cm² for the same membrane electrode assemblies for which data is illustrated in FIG. 4.

FIG. 5 shows a temperature sweep at 1.6 A/cm$^2$ for Comparative Example 1, Example 3 and Example 4. This illustrates the good performance of Example 3 and Example 4 over a range of humidities (indicated in the Figure). Some characteristics of the layers in these examples are provided in Table 7.

TABLE 7

|  | Permeability nm$^2$ | Contact angle ° | Layer thickness μm |
|---|---|---|---|
| LA1 layer | 63 | 106 | 5.3 |
| LA2 layer | 21 | 101 | 4.9 |
| EL2 layer | 19 | 109 | 4.4 |

Figure 6:
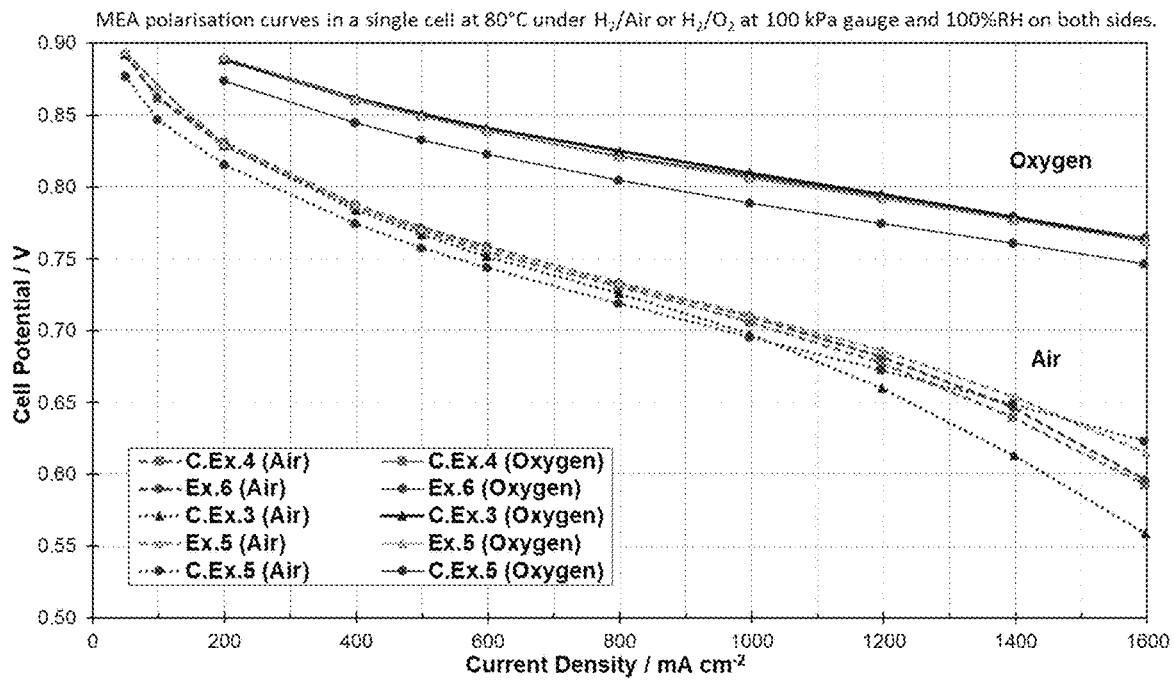
FIG. 6 is a is a plot showing voltage versus current density for membrane electrode assemblies comprising catalysed ion-conducting membranes of the invention in which the cathode electrocatalyst layers have different permeabilities, and membrane electrode assemblies comprising a comparative catalysed ion-conducting membrane having no layer A.

FIG. 6 shows polarisation curves for Comparative Examples 3, 4 and 5, as well as Examples 5 and 6. Comparative Examples 3 and 4, as well as Example 5 and 6 contain the same electrocatalyst. Comparative Example 5 contains a high performing Pt electrocatalyst. As can be seen in FIG. 6, it performs well under air at high current density. Comparative Examples 3 and 4 perform better under oxygen, showing that these electrocatalysts are kinetically more active than Comparative Example 5. However, they do not perform as well as Comparative Example 5 under air at high current density. For most fuel cell applications, high performance on air is the most important objective to be achieved, whilst using low quantities of Pt to achieve this performance.

Example 5 corresponds to Comparative Example 3 with the addition of a layer A. The performance at high current density under air of Example 5 is better than that of Comparative Example 3, and close to Comparative Example 5. The electrocatalyst layer in Example 5 has a permeability of 17 nm$^2$. Accordingly, the layer A has improved the performance under air at high current densities of an electrocatalyst layer which has high kinetic performance.

Example 6 corresponds to Comparative Example 4 with the addition of a layer A. The performance at high current density under air of Example 6 is similar to that of Comparative Example 4. The permeability of the electrocatalyst layer in Example 6 is 21 nm$^2$. Table 8 collates the permeabilities of the layers in these examples.

TABLE 8

|  | Permeability nm$^2$ |
|---|---|
| LA1 layer | 63 |
| EL3 layer | 17 |
| EL4 layer | 21 |

Figure 7:
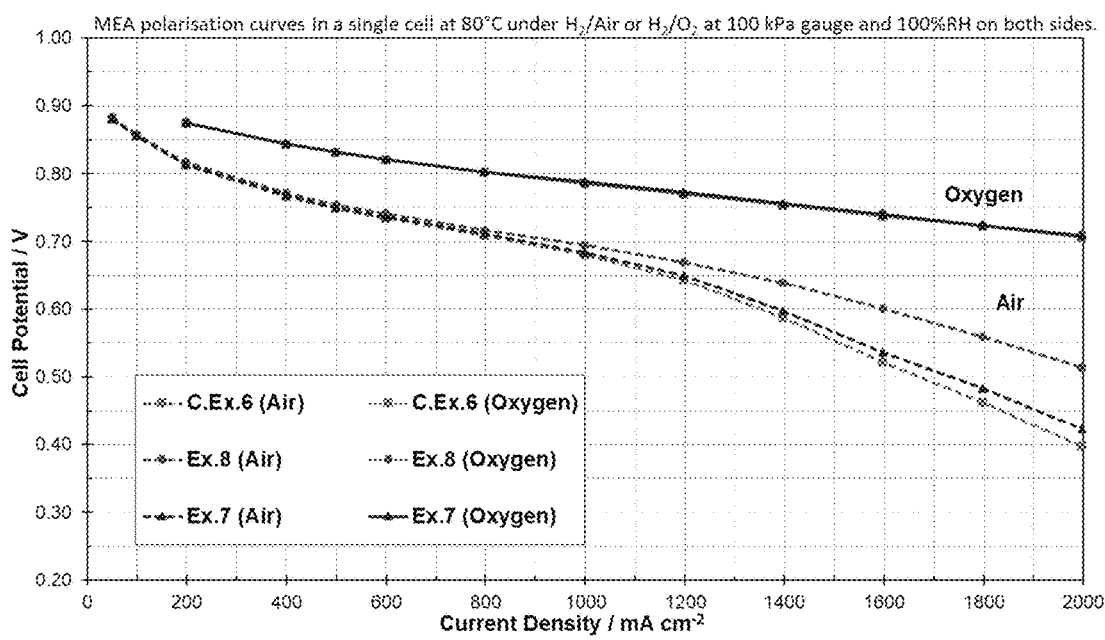
FIG. 7 is a plot showing voltage versus current density for membrane electrode assemblies comprising catalysed ion-conducting membranes of the invention prepared by applying the layer A to a gas diffusion layer prior to application of the electrocatalyst layer and combination with an ion-conducting membrane.

FIG. 7 shows polarisation curves for Comparative Example 6 and Examples 7 and 8. All of these examples contain the same electrocatalyst layer. Examples 7 and 8 both contain a layer A of the same identity. Example 7 was prepared by first applying layer A to the microporous layer of a gas diffusion layer before addition of the electrocatalyst layer to the layer A and subsequent transfer to the ion-conducting membrane. Example 8 was prepared by first applying layer A to a PTFE backing layer before addition of the electrocatalyst layer to the layer A and subsequent transfer to the ion-conducting membrane (i.e. the same way as the other examples). Both preparation methods result in an improvement in performance. However, there is an improvement when the electrocatalyst layer and layer A are prepared by first applying the layer A and the electrocatalyst layer to a backing layer prior to transfer to the ion-conducting membrane.

Figure 8:
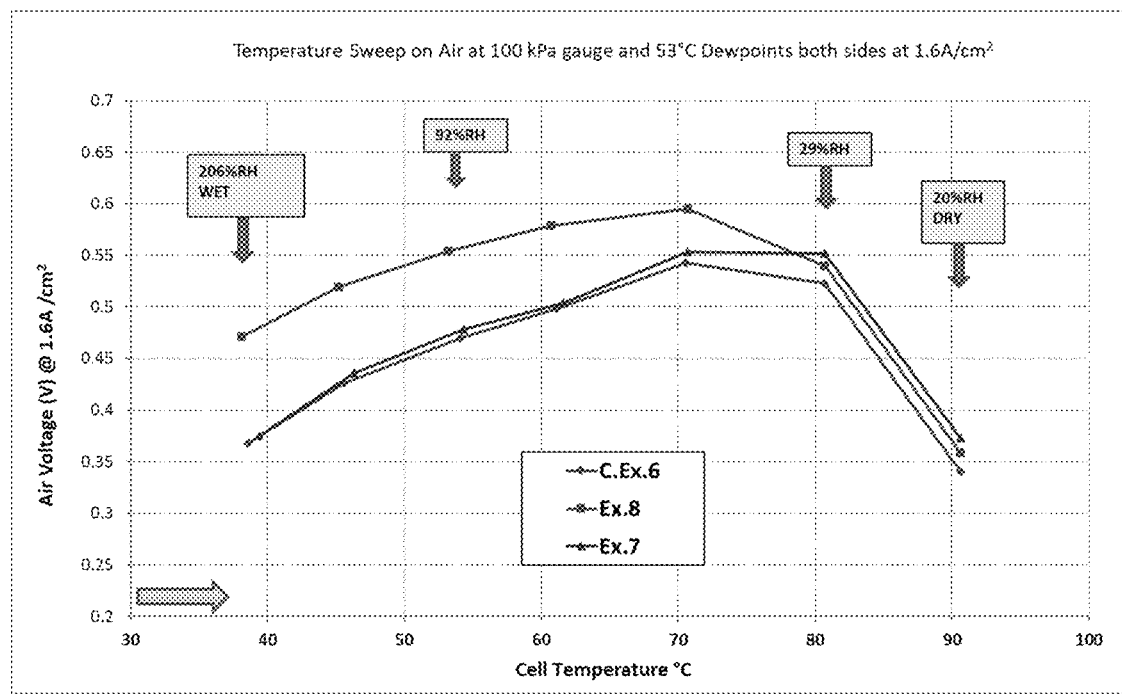
FIG. 8 is a temperature sweep at 1.6 A/cm² for the same membrane electrode assemblies for which data is illustrated in FIG. 7.

FIG. 8 shows a temperature sweep at 1.6 A/cm$^2$ for Comparative Example 6, Example 7 and Example 8. This illustrates the good, improved, performance of Example 7 and Example 8 over a range of humidities (indicated in the Figure). The permeabilities of the layers in these examples are provided in Table 9.

TABLE 9

|  | Permeability nm$^2$ |
|---|---|
| LA1 layer | 63 |
| EL5 layer | 13 |

A non-exhaustive list of embodiments of the invention is provided in the following numbered clauses:

Clause 1. A catalysed ion-conducting membrane comprising an ion-conducting membrane, an electrocatalyst layer having two opposing faces, and a layer A, wherein:
  the layer A and the ion-conducting membrane are adjacent to opposite faces of the electrocatalyst layer;
  the layer A comprises an ion-conducting material $I_A$ and a carbon containing material $C_A$;
  the electrocatalyst layer comprises an ion-conducting material $I_B$ and an electrocatalyst.

Clause 2. A catalysed ion-conducting membrane according to clause 1, wherein the layer A is hydrophobic.

Clause 3. A catalysed ion-conducting membrane according to clause 1 or clause 2, wherein the layer A has a permeability, $k_1$, of at least 15 nm$^2$, and the electrocatalyst layer has a permeability, $k_2$, of no more than 25 nm$^2$.

Clause 4. A catalysed ion-conducting membrane according to any preceding clause, wherein the weight ratio of ion-conducting material $I_A$ to carbon containing material $C_A$ in layer A is in the range of and including 2:1 to 1:2.

Clause 5. A catalysed ion-conducting membrane according to any preceding clause, wherein the electrocatalyst is supported.

Clause 6. A catalysed ion-conducting membrane according to clause 5, wherein the electrocatalyst is supported on a carbon containing material $C_B$.

Clause 7. A catalysed ion-conducting membrane according to any preceding clause, wherein the electrocatalyst layer is a cathode electrocatalyst layer.

Clause 8. A membrane electrode assembly comprising the catalysed ion-conducting membrane according to any of clauses 1 to 7.

Clause 9. A fuel cell comprising the catalysed ion-conducting membrane according to any of clauses 1 to 7, or the membrane electrode assembly according to clause 8.

Clause 10. A method of preparing the catalysed ion-conducting membrane according to any of clauses 1 to 7 comprising:
  i) applying an electrocatalyst layer ink onto a layer A, or onto a layer of a layer A ink; or
  ii) applying a layer A ink onto an electrocatalyst layer, or onto a layer of an electrocatalyst layer ink;
  wherein the electrocatalyst layer ink comprises an ion-conducting material $I_B$ and an electrocatalyst; and
  the layer A ink comprises an ion-conducting material $I_A$ and a carbon containing material $C_A$.

Clause 11. A method according to clause 10, the method comprising the steps of:
  i) applying an electrocatalyst layer ink onto an ion-conducting membrane and then drying the ink to form an electrocatalyst layer; then
  ii) applying a layer A ink onto the electrocatalyst layer then drying the ink to form a layer A.

Clause 12. A method according to clause 10, the method comprising the steps of:
i) applying a layer A ink onto a substrate then drying the ink to form a layer A; then
ii) applying an electrocatalyst layer ink onto the layer A formed in step i) then drying the ink to form an electrocatalyst layer;
iii) combining the layers with an ion-conducting membrane such that the electrocatalyst layer is adjacent to the ion-conducting membrane.

Clause 13. A method according to clause 12, wherein the substrate is a decal transfer substrate and step iii) is carried out by transferring the combined layers onto an ion-conducting membrane by decal transfer from the transfer substrate.

Clause 14. A method of preparing a membrane electrode assembly according to clause 8, the method comprising the steps of:
i) applying an electrocatalyst layer ink onto an ion-conducting membrane and then drying the ink to form an electrocatalyst layer then
ii) applying a layer A ink onto the electrocatalyst layer then drying the ink to form a layer A;
wherein the electrocatalyst layer ink comprises an ion-conducting material $I_B$ and an electrocatalyst; and
the layer A ink comprises an ion-conducting material $I_A$ and a carbon containing material $C_A$.

Clause 15. The method according to clause 14, further comprising applying a gas diffusion substrate to the layer A.

Clause 16. A method of preparing a membrane electrode assembly according to clause 8, the method comprising the steps of:
i) applying a layer A ink onto a substrate then drying the ink to form a layer A; then
ii) applying an electrocatalyst layer ink onto the layer A formed in step i) then drying the ink to form an electrocatalyst layer;
iii) combining the layers with an ion-conducting membrane such that the electrocatalyst layer is adjacent to the ion-conducting membrane;
wherein the electrocatalyst layer ink comprises an ion-conducting material $I_B$ and an electrocatalyst; and
the layer A ink comprises an ion-conducting material $I_A$ and a carbon containing material $C_A$.

Clause 17. A method according to clause 16, wherein the substrate is a decal transfer substrate and step iii) is carried out by transferring the combined layers onto an ion-conducting membrane by decal transfer from the transfer substrate.

Clause 18. A method according to clause 16, wherein the substrate is a gas diffusion layer.

What is claimed:

1. A catalysed ion-conducting membrane comprising an ion-conducting membrane, an electrocatalyst layer having two opposing faces, and a layer A, wherein:
the layer A and the ion-conducting membrane are adjacent to opposite faces of the electrocatalyst layer;
the layer A comprises an ion-conducting material $I_A$ and a carbon containing material $C_A$;
the electrocatalyst layer comprises an ion-conducting material $I_B$ and an electrocatalyst; and,
the layer A has a permeability, $k_1$, of at least 15 nm$^2$, and the electrocatalyst layer has a permeability, $k_2$, of no more than 25 nm$^2$.

2. The catalysed ion-conducting membrane according to claim 1, wherein the layer A is hydrophobic.

3. The catalysed ion-conducting membrane according to claim 1, wherein the weight ratio of ion-conducting material $I_A$ to carbon containing material $C_A$ in layer A is in the range of and including 2:1 to 1:2.

4. The catalysed ion-conducting membrane according to claim 1, wherein the electrocatalyst is supported.

5. The catalysed ion-conducting membrane according to claim 4, wherein the electrocatalyst is supported on a carbon containing material $C_B$.

6. The catalysed ion-conducting membrane according to claim 1, wherein the electrocatalyst layer is a cathode electrocatalyst layer.

7. A fuel cell comprising the catalysed ion-conducting membrane according to claim 1.

8. A membrane electrode assembly comprising the catalysed ion-conducting membrane according to claim 1.

9. A fuel cell comprising the membrane electrode assembly according to claim 8.

10. A method of preparing the catalysed ion-conducting membrane according to claim 1 comprising:
i) applying an electrocatalyst layer ink comprising the ion-conducting material $I_B$ and the electrocatalyst onto the layer A, or onto a layer of a layer A ink that comprises the ion-conducting material $I_A$ and the carbon containing material $C_A$; or
ii) applying the layer A ink onto the electrocatalyst layer, or onto a layer electrocatalyst layer ink.

11. The method according to claim 10 comprising the steps of:
i) applying the electrocatalyst layer ink onto an ion-conducting membrane and then drying the ink to form the electrocatalyst layer; then ii) applying the layer A ink onto the electrocatalyst layer then drying the ink to form the layer A.

12. The method according to claim 10 comprising the steps of:
i) applying the layer A ink onto a substrate then drying the ink to form the layer A; then
ii) applying the electrocatalyst layer ink onto the layer A formed in step i) then drying the ink to form an electrocatalyst layer;
iii) combining the layers with an ion-conducting membrane such that the electrocatalyst layer is adjacent to the ion-conducting membrane.

13. The method according to claim 12, wherein the substrate is a decal transfer substrate and step iii) is carried out by transferring the combined layers onto an ion-conducting membrane by decal transfer from the transfer substrate.

14. A method of preparing the membrane electrode assembly according to claim 7, the method comprising the steps of:
i) applying an electrocatalyst layer ink comprising the ion-conducting material $I_B$ and the electrocatalyst onto an ion-conducting membrane and then drying the ink to form an electrocatalyst layer then
ii) applying a layer A ink comprising the ion-conducting material $I_A$ and the carbon containing material $C_A$ onto the electrocatalyst layer then drying the ink to form a layer A.

15. The method according to claim 14, further comprising applying a gas diffusion substrate to the layer A.

16. A method of preparing a membrane electrode assembly according to claim 7, the method comprising the steps of:

i) applying a layer A ink comprising an ion-conducting material $I_A$ and a carbon containing material $C_A$ onto a substrate then drying the ink to form a layer A; then ii) applying an electrocatalyst layer ink comprising an ion-conducting material $I_B$ and an electrocatalyst onto the layer A formed in step i) then drying the ink to form an electrocatalyst layer; and, iii) combining the layers with an ion-conducting membrane such that the electrocatalyst layer is adjacent to the ion-conducting membrane.

17. The method according to claim 16, wherein the substrate is a decal transfer substrate and step iii) is carried out by transferring the combined layers onto an ion-conducting membrane by decal transfer from the transfer substrate.

18. The method according to claim 16, wherein the substrate is a gas diffusion layer.

* * * * *